US008533020B2

(12) United States Patent
Haynes et al.

(10) Patent No.: US 8,533,020 B2
(45) Date of Patent: *Sep. 10, 2013

(54) MANAGEMENT OF USER EVENTS SCHEDULED DURING A USER ABSENCE PERIOD

(75) Inventors: Thomas R. Haynes, Apex, NC (US); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/550,779

(22) Filed: Jul. 17, 2012

(65) Prior Publication Data

US 2012/0296859 A1 Nov. 22, 2012

Related U.S. Application Data

(63) Continuation of application No. 12/406,649, filed on Mar. 18, 2009, now Pat. No. 8,255,256.

(51) Int. Cl.
*G06Q 10/00* (2012.01)

(52) U.S. Cl.
USPC ........ 705/7.18; 705/7.13; 705/7.16; 705/7.19

(58) Field of Classification Search
USPC .............................. 705/7.13, 7.18, 7.19, 7.16
See application file for complete search history.

(56) References Cited

U.S. PATENT DOCUMENTS

| | | | |
|---|---|---|---|
| 4,819,191 A | | 4/1989 | Scully et al. |
| 5,555,346 A | * | 9/1996 | Gross et al. ..................... 706/45 |
| 6,101,480 A | | 8/2000 | Conmy et al. |
| 6,167,379 A | | 12/2000 | Dean et al. |
| 6,295,541 B1 | * | 9/2001 | Bodnar et al. ........................ 1/1 |
| 6,988,128 B1 | * | 1/2006 | Alexander et al. ............ 709/206 |
| 2004/0088362 A1 | * | 5/2004 | Curbow et al. ............... 709/207 |
| 2004/0161090 A1 | * | 8/2004 | Digate et al. ............. 379/202.01 |
| 2004/0243677 A1 | * | 12/2004 | Curbow et al. ............... 709/206 |

(Continued)

OTHER PUBLICATIONS

Padwick, ("Special Edition: Using Microsoft Outlook 2002", 2001, Published by Que Publishing, pp. 423-424, 450-451.*

(Continued)

*Primary Examiner* — Justin M Pats
*Assistant Examiner* — Ivan R Goldberg
(74) *Attorney, Agent, or Firm* — Thomas E. Lees, LLC

(57) ABSTRACT

User events scheduled during a user absence period are managed by identifying a user absence period and a buffer period on a user calendar. At least one calendaring repository is searched to determine whether there are user events with a due date coming due during the user absence period that were scheduled prior to a user defining the user absence period and a response is made to each located user event. Moreover, at least one calendaring repository is searched to determine whether there are user events with a due date coming due during the buffer period that were scheduled prior to the user defining the buffer period and a response is made to each located user event in a manner differently from responding to user events coming due during the user absence period.

21 Claims, 7 Drawing Sheets

(56) References Cited

U.S. PATENT DOCUMENTS

| | | | |
|---|---|---|---|
| 2005/0288987 A1* | 12/2005 | Sattler et al. | 705/9 |
| 2007/0016465 A1* | 1/2007 | Schaad | 705/9 |
| 2007/0260694 A1* | 11/2007 | Boss et al. | 709/207 |
| 2008/0091504 A1* | 4/2008 | Lyle et al. | 705/9 |
| 2008/0120616 A1* | 5/2008 | James et al. | 718/100 |
| 2008/0127231 A1* | 5/2008 | Shaffer et al. | 719/328 |
| 2008/0133302 A1* | 6/2008 | Brauninger et al. | 705/8 |
| 2008/0167937 A1* | 7/2008 | Coughlin et al. | 705/9 |
| 2008/0167938 A1* | 7/2008 | Meisels et al. | 705/9 |
| 2009/0171988 A1* | 7/2009 | Kikin-Gil | 707/100 |
| 2009/0319926 A1* | 12/2009 | Chakra et al. | 715/764 |

OTHER PUBLICATIONS

Email Responder for Microsoft Outlook, http://www.e-mailresponder.com/default.asp, 1999-2008, 4Team Corporation. Last accessed on Mar. 18, 2009.

Email Responder for Microsoft Outlook Features, http://www.e-mailresponder.com/WebHelp/e-Mail_Responder_Help.htm#Features.htm, 1999-2008, 4Team Corporation. Last accessed on Mar. 18, 2009.

* cited by examiner

MANAGEMENT OF USER EVENTS SCHEDULED DURING A USER ABSENCE PERIOD

CROSS-REFERENCE TO RELATED APPLICATIONS

This application is a continuation of U.S. patent application Ser. No. 12/406,649, filed Mar. 18, 2009, entitled "IMPROVED MANAGEMENT OF USER EVENTS SCHEDULED DURING A USER ABSENCE PERIOD", now allowed, the disclosure of which is hereby incorporated by reference.

BACKGROUND OF THE INVENTION

This invention relates to the management of scheduled user events when the user is absent. Events to be managed are emails with a scheduled due date or follow-up, meetings, chat appointments and instant messages with scheduled due dates.

Calendaring and collaboration tools provide the ability to schedule events comprising meetings, appointments, tasks or the like. Using the conventional calendar tools a user may organize and schedule meetings on one or more calendars and update or modify the information associated with the scheduled event. In addition, the user may check the availability of other users before scheduling a meeting with them. Finally, conventional calendar tools permit the user to view his/her scheduled appointments by the day, week, or month.

Using the tools described a user may schedule a meeting, assign a task, schedule an online meeting or delivery due date, send an email, or reschedule a meeting. It is conceivable and likely to schedule a meeting or appointment with a friend or associate for a future date and the person with whom the appointment is made becomes unavailable for the appointment due to a vacation, scheduling change, business trip or unplanned emergency. Before the person becomes unavailable, manually notifying or managing uses participating in the scheduled the appointments or meetings of the unavailability is cumbersome and error prone.

SUMMARY OF THE INVENTION

According to aspects of the present invention, user events scheduled during a user absence period are managed by identifying a user absence period defined on a user calendar and identifying a buffer period, the buffer period being at least one of a period of time before the user absence period begins and a period of time after the user absence period concludes. User events are further managed by searching at least one calendaring repository to determine whether there are any user events with a due date coming due during the user absence period that were scheduled prior to a user defining the user absence period and responding, using a processor, to each user event scheduled prior to a user defining the user absence period and having a due date coming due during the user absence period. User events are still further managed by searching at least one calendaring repository to determine whether there are any user events with a due date coming due during the buffer period that were scheduled prior to the user defining the buffer period and responding, using the processor, to each user event scheduled prior to the user defining the buffer period and having a due date coming due during the buffer period, in a manner differently from responding to user events coming due during the user absence period.

Embodiments of the present invention may be implemented an apparatus, a computer program product, and a system executing the operations of the method described above. The apparatus and/or system implementation may include a definition module, a search module, and a response module. The apparatus and/or system implementation may also include a presentation module, a user interface module, a monitoring module, a detection module, a reporting module, a response module, a configuration module. Each of these modules will be described in more detail below as example embodiments of the invention are described.

Reference throughout this specification to features, advantages, or similar language does not imply that all of the features and advantages that may be realized with an embodiment of the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

BRIEF DESCRIPTION OF THE DRAWINGS

Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
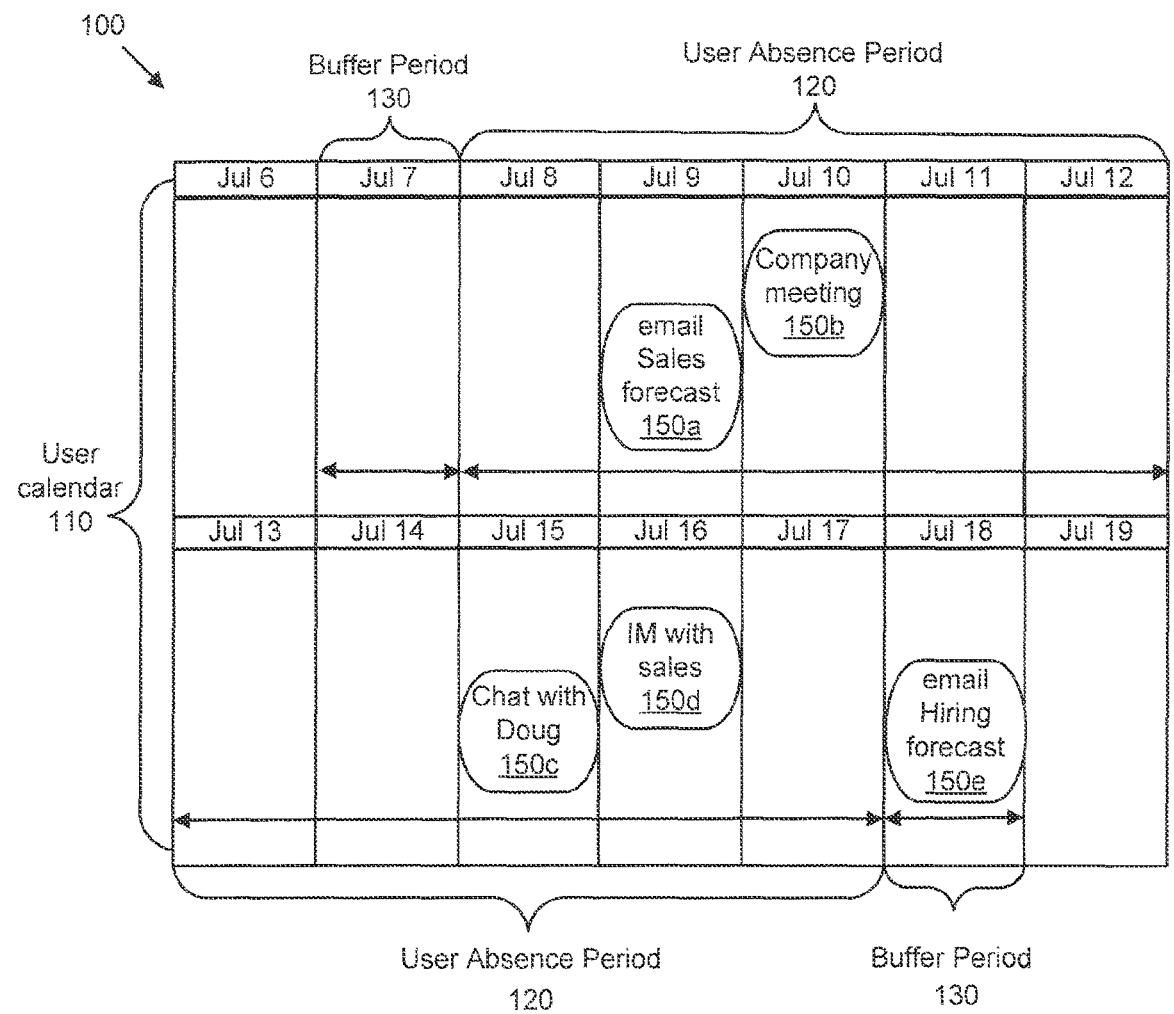
FIG. 1 is an illustration of a calendar with user events scheduled during a user period of absence, in accordance with one embodiment of the invention

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the invention. Thus, appearances of the phrases "in one embodiment," "in an embodiment," and similar language throughout this specification may, but do not necessarily, all refer to the same embodiment.

As will be appreciated by one skilled in the art, the embodiments of the invention may be embodied as a method, system, or computer program product. Accordingly, the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the embodiments of the invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, or semiconductor system, apparatus, device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, or transport the program for use by or in connection with the instruction execution system, apparatus, or device. The computer usable program code may be transmitted using any appropriate medium, including but not limited to the Internet, wireless, optical fiber cable, RF, etc.

Computer program code for carrying out operations of the embodiments of the invention may be written in an object oriented programming language such as Java, Smalltalk, C++ or the like. However, the computer program code for carrying out operations of the embodiments of the invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

An automated tool to search multiple calendaring repositories and or other schedule repositories for meetings, and items with a requested follow-up date or start date or end date that comes due during the time period that the user is to be unavailable is needed. Furthermore, a tool that will automatically handle these requests when the user is out of the office is advantageous. The different embodiments of the invention solve this problem and allow the user to plan for the future by defining how requests coming due during the unavailable period will be handled.

Furthermore, the embodiments of the invention allow the user to review the predefined responses for events scheduled during an absence period when he/she activates the tool and then modify a response if desired. Additionally, the user may plan into the future and build response templates for periods of time when he/she will be unavailable. Finally, the tool may provide a summary of the events handled during the absence period.

The embodiments of the invention have been developed to provide an improved method for managing user events scheduled during a user absence period.

A method for managing user events scheduled during a user absence period comprises determining a user absence period having a start date and an end date, the user absence period defined on a user calendar, detecting a new user event scheduled during the user absence period, the user event comprising a start/end date that falls within the user absence period, automatically responding to the new user event scheduled during the user absence period, and the new user event scheduled after the user absence period is defined.

The solution defines the user absence period, in response to user input from a user that manages the user calendar. Each user event may comprise one or more of an electronically scheduled meeting, an email having a follow-up due date, a chat appointment, and an instant message(IM) to-do item.

The solution automatically responds by applying one or more response rules in response to a user event satisfying a user event criteria, the user event criteria may comprise one or more of a user event communication type, a user event action type, a user event sender, a user event distribution list, a user event attachment, a buffer time period associated with the user absence period, and a priority level of the user event.

The solution defines one or more response rules by way of a user interface, the response rules comprising an action selected from the group comprising, declining the new user event, accepting the new user event, delegating the new user event, notifying an organizer of the new user event, notifying a distribution list of the new user event, and ignoring the new user event.

The solution searches at least one calendaring repository for one or more scheduled user events having a due date during a user absence period, the one or more scheduled user events scheduled prior to defining the user absence period. In certain embodiments, the calendaring repository includes more items than simply dates and deadlines of a calendar. In certain embodiments, the calendaring repository includes a variety of electronic media used to track and manage a user event including emails with follow-up dates, task assignments with due dates, chat items that include todos or appointment dates, and the like. The solution interactively responds to each scheduled user event coming due during the user absence period and prompts the user to manually manage one or more of the scheduled user events coming due during the user absence period.

In one embodiment, the user absence period comprises a buffer time period. There may be one buffer time period before a user absence period and/or one buffer time period after a user absence period. In one embodiment, the solution sets a buffer time period before the user absence period begins and after the user absence period concludes in response to user input, applying one or more user defined response rules in response to a user event satisfying user event criteria.

FIG. 1 illustrates a system 100 for displaying a user calendar 110. Specifically, the user calendar 110 depicts a two week period of time, and includes events scheduled to occur during the two week period of time. The events appear on a user calendar 110 and require the user of the user calendar 110 to take an action, such as attend a meeting, or complete a task.

The user calendar 110 depicts a user absence period 120. The user absence period 120 illustrating a period of time when the user of the user calendar 110 plans to be unavailable to attend meetings, respond to emails, attend chat appointments or respond to instant messages (IM's). The unavailability of the user may be due to a vacation, a business trip, or just needing a period of undisturbed time.

Additionally, the user calendar 110 illustrates a buffer period 130, the buffer period 130 is a period of time immediately before a user absence period 120 begins and/or a period of time immediately after the user absence period 120 concludes. The buffer period 130 may represent a period of time when the user is available but at a reduced productivity level due to preparing for the user absence period 120. The user absence period 120 and the buffer period 130 may be adjusted to meet the needs of the user and FIG. 1 is simply an illustration of one possible user calendar 110.

The user calendar 110 includes user events 150a-e with user events 150a-d scheduled during a user absence period 120. In particular, the user events 150a-e may consist of an email user event 150a, a meeting user event 150b, a chat appointment user event 150c, an instant message (IM) appointment user event 150d, a task assignment (a ToDO) (not shown), and finally an email user event 150e coming due during a buffer period 130.

The user events 150a-e are only a representation of any number of user events 150a-e that could be scheduled during the user absence period 120. As used herein, the term "user event" is intended to mean one or more of an activity that includes the user and has an associated date and/or time. Thus, a user event may comprise a meeting, an assignment, a telephone conference, a project submission deadline, a project due date, a personal meeting appointment, an online chat or meeting appointment, and the like. The user events 150a-e represent events that users other than the calendar owner may schedule to include the owner. These events may arrive by way of a synchronous communication with the calendar owner such as with a chat session or by way of an asynchronous communication such as with email and/or certain chat technologies. Additionally, the owner of the user calendar 110 may schedule the user events 150a-e.

FIG. 1 is a graphical representation of a user calendar 110, identifying a user absence period 120 and a buffer period 130. The user calendar 110 includes user events 150a-e scheduled to come due during the user absence period 120. Conversely, a user calendar 110 may be represented in a separate file that may define and/or describe the user absence period 120, the buffer period 130, and the user events 150a-e. The separate file may comprise a plain text file, an XML file, a word file, a spreadsheet or the like. The file may exist in RAM, on local storage, on a network storage repository, or the like.

Before a user leaves for a vacation, takes a business trip or otherwise becomes unavailable a user without the embodiments of the invention searches multiple calendaring repositories for user events 150a-e with a due date coming due during a user absence period 120 or buffer period 130. Once identified, the user must decide how each user event 150a-e having a due date coming due during a user absence period will be handled. In addition new user events 150a-e may be scheduled during the user absence period 120 or buffer period 130. Consequently the need for a system that manages the user events 150a-e scheduled during the user absence period 120 assists the user in managing the user events 150a-e. An apparatus, system, and method in accordance with the embodiments of the invention saves time over a manual process requiring searching calendaring repositories for scheduled user events 150a-e and notifying users that may want to schedule a user event 150a-e.

Figure 2:
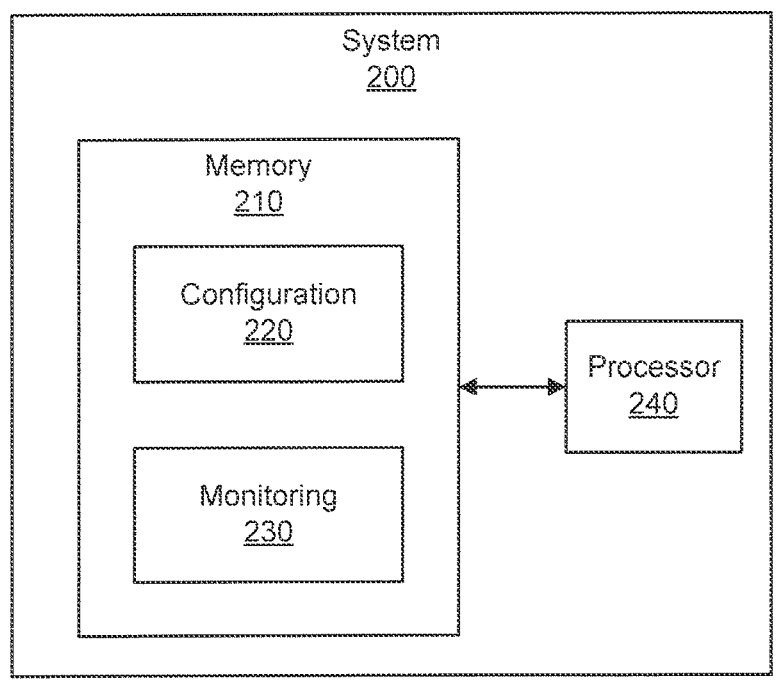
FIG. 2 is a block diagram illustrating one embodiment of a system for improved management of user events scheduled during a user absence period, in accordance with one embodiment of the invention.

FIG. 2 illustrates one embodiment of a system 200 for improved management of user events scheduled during a user absence period 120. The system 200 includes a configuration module 220 and a monitoring module 230. The system 200 runs in a software execution environment which may include an Operating System (OS), and support user interface tools such as stand alone or web-based calendaring systems. The OS may be Windows, Macintosh, UNIX, Linux or the like.

The system 200 may comprise a workstation application, a servlet, a desktop application, a server application, a client application, a web-based application, a memory 210 and a processor 240.

In one embodiment, the configuration module 220 and the monitoring module 230 are written in a programming language such as Java, C++, C, or the like. The configuration module 220 and monitoring module 230 may execute in an environment consisting of a small or large stand alone or networked system of laptops, workstations, or mainframe computers. The configuration module 220 and monitoring module 230 are configured to execute applications, and may include a Database Management System (DBMS). The configuration module 220 and monitoring module 230 may connect to the World Wide Web (WWW). The configuration module 220 and monitoring module 230 may be executing in the same computing device or in geographically different locations from each other.

The configuration module 220 interacts with the user to define and revise the management of user events 150a-e. In particular, the configuration module 220 defines the user absence period 120 and buffer period 130. In addition, the configuration module 220 searches one or more calendaring repositories for scheduled user events having a due date during the user absence period 120. The configuration module 220 presents user events 150a-e scheduled during the user absence period 120. In one embodiment, an owner of the calendar 110 uses the configuration module 220 to quickly identify and manage user events 150a-e that are scheduled during the user absence period 120 or are scheduled to be completed during the user absence period 120.

The monitoring module 230 interacts with the system 200 to detect, respond to and report user events 150a-e scheduled during a user absence period 120. In particular, the monitoring module 230 detects the user events 150a-e scheduled to come due during the user absence period 120. In addition, the monitoring module 230 may in certain embodiments respond to the user event 150a-e with a user defined automatic action. Additionally, the monitoring module 230 may report the number of user events 150a-e responded to. In one embodiment, the user events 150a-e are events scheduled by users requiring the owner of the user calendar to attend a meeting or complete a task.

Figure 3:
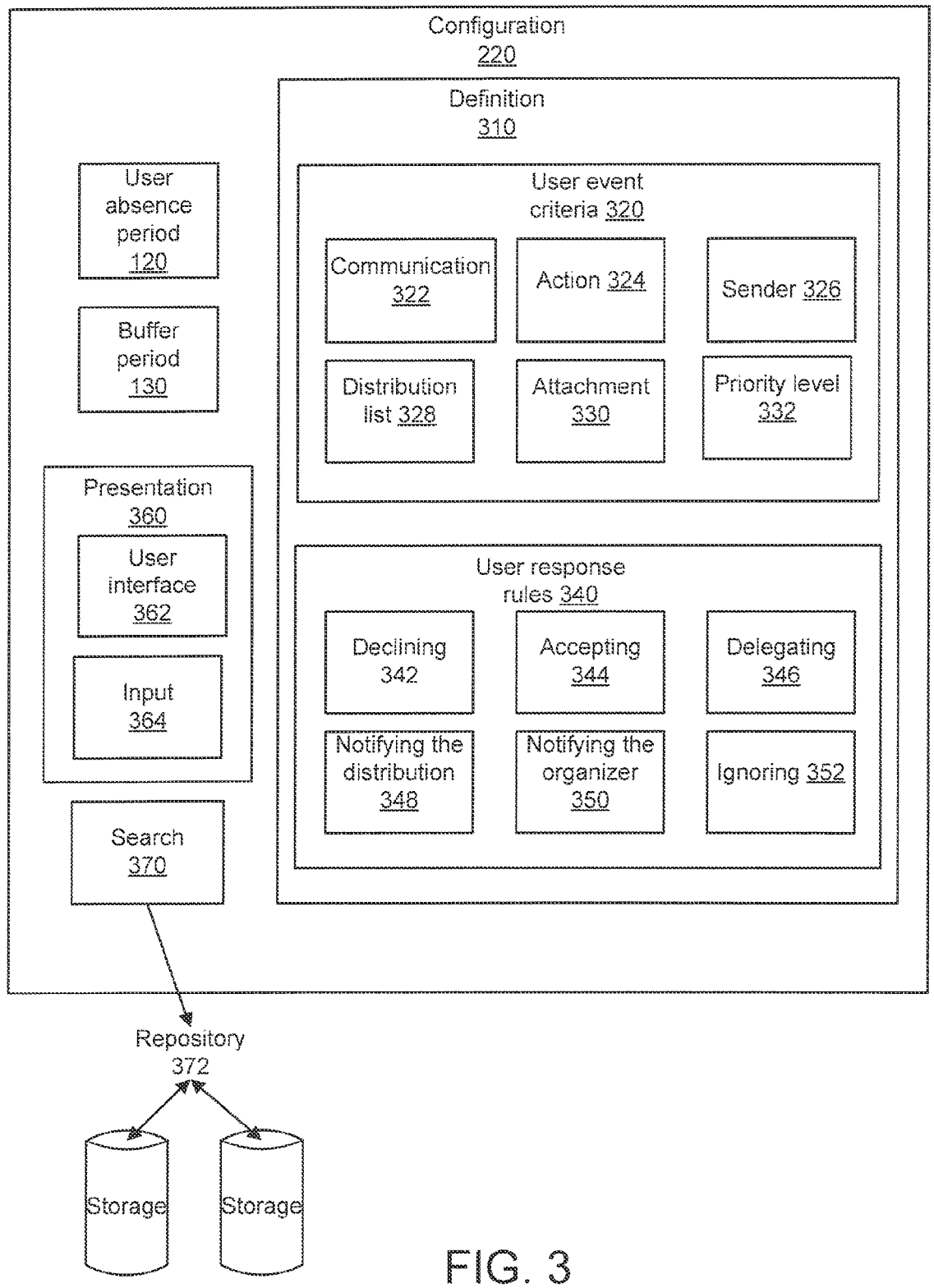
FIG. 3 is a block diagram illustrating another embodiment of a configuration module for improved management of user events scheduled during a user absence period, in accordance with one embodiment of the invention.

FIG. 3 illustrates one embodiment of a configuration module 220 for improved management of user events 150a-e scheduled during a user absence period 120. The configuration module 220 includes a definition module 310, a presentation module 360, and a search module 370. The Presentation module 360 includes a user interface module 362 and an input module 364.

The configuration module 220 interacts with the owner of a user calendar 110 to configure and present a user absence period 120. Specifically, configuration module 220 configures a period of time that the owner of a user calendar 110 may be on vacation, a business trip or otherwise unavailable. In one embodiment, the configuration module 220 presents a graphical user interface (GUI) and prompts the user to enter a user absence period 120 starting date and ending date.

Optionally, the configuration module 220 interacts with the owner of a user calendar 110 to configure and present a buffer period 130. In particular, the configuration module 220 configures a buffer period 130. The buffer period 130 being a period of time before the user absence period 120 begins and a period of time after the user absence 120 concludes. In one embodiment, the buffer periods 130 are of equal duration. In another embodiment, the buffer periods 130 are not of equal duration. It may be of value to the owner of a user calendar 110 to configure the buffer period 130 before the user absence 120 begins to be of different during duration.

The configuration module 220 interacts with a system 200 to save the user calendar. In one embodiment, the user calendar 110 may be saved in a repository (not shown) of user calendars 110. The repository of user calendars 110 is capable of storing multiple user calendars 110.

In one embodiment, the user absence period 120 may comprise a start date followed by a duration. In yet another embodiment, the user absence period 120 may comprise an offset from the beginning of a calendar year, for example: the user absence period 120 may commence 50 days from midnight January $1^{st}$ and conclude 60 days from midnight January $1^{st}$. In an alternative embodiment, the user absence period 120 may comprise a start month/day/year and end month/day/year.

In one embodiment, the configuration module 220 receives the user absence period 120 from a user that manages the user calendar 110. In yet another embodiment, the configuration module 220 may determine the user absence period 120 via a script, an extensible markup language (XML) input file, an application program interface (API), a command line interface, or the like. In yet another embodiment, a graphical user interface (GUI) may be used to input the user absence period 120.

Optionally, the owner of a user calendar may configure a buffer period 130 to begin a period of time before the user absence period 120 begins, and to conclude a period of time after a user absence period 120 concludes. In one embodiment, the owner of the calendar may configure the before a buffer period 130 to be the same length as the after buffer period 130. Alternatively, the owner of the calendar may configure the before buffer period 130 and after buffer period to be of unequal lengths. In one embodiment, the calendar owner may configure only a before buffer period 130 or only an after buffer period 130.

The definition module 310 interacts with a user to define criteria and automatic responses. In particular, the definition module 310 defines the user event criteria 320 to compare with new user events 540 (FIG. 5), and the associated user response rules 340. In one embodiment, if a new user event 540 (FIG. 5) satisfies the defined user event criteria 320 the system 200 responds automatically with an action defined by the user response rules 340.

Additionally, the definition module 310 interacts with the presentation module 360 to present information to and receive information from the user. Specifically, the definition module 310 interacts with the user interface module 362 to present a user calendar 110 and prompt the calendar owner to define user event criteria 320 and user response rules 340. In one embodiment, the system 200 uses the presentation module 360 to present a graphical user interface (GUI) to define user event criteria 320 and user response rules 340.

The presentation module 360 interacts with the user interface module 362 to output graphics and text, and with the input module 364 to receive user input. In particular, the presentation module 360 presents a user absence period management page to the user interface module 362 and prompts a calendar owner to enter user event criteria 320 and user response rules 340.

The user interface module 362 interfaces with an output device to present a user absence period management page. The owner of a user calendar 110 configures the user event criteria 320 that the monitoring module 230 uses to determine if a new user event 150a-e satisfies the criteria for an automatic response action. In one embodiment, the user interface module 362 outputs a GUI, a text menu, a printer menu a disk file or the like.

In one embodiment, the input module 364 interfaces with input devices to receive user event criteria 320 and user response rules 340 from a keyboard, mouse, disk file, or the like.

The definition module 310 interacts with the owner of a user calendar 110 to define the user event criteria 320. User event criteria 320 is a set of criteria a calendar owner user wants to use to identify user events 150a-e coming due during the user absence period 120. In particular, the calendar owner defines the criteria values to determine if a user event 150a-e satisfies the requirements for an automatic response. Below are representative examples of a few possible user event criteria 320 category types: 1) communication type 332, comprising an email, a chat or an IM, a task assignment. 2) action type 324, comprising a meeting invitation, a task assignment (a ToDO), an email with a follow-up to do, a chat appointment or an IM with a to do. 3) sender type 326, a sender of the communication. 4) distribution list type 328, all users included on the distribution list. 5) attachment type 330, any attachments to the user event 150a-e 6) priority level type 332, a user event 150a-e priority level, and the like. User event criteria 320 may include whether the user event 150 has a start/end date during the absences period or during the buffer period or a combination of these. With such user event criteria 320 set, the user can then define whether events satisfying that criteria will have one or more response rules applied. The automated response rules may define an action or a response that the system takes based on the match. For example in one embodiment a match may result in a notification being sent to a user event organizer automatically. Alternatively, or in addition, the automatic response to user events satisfying the user event criteria 320 may result in the user event being displayed for a user such that the user can then manually determine what responses are made for each user event identified.

The definition module 310 interacts with the owner of a user calendar 110 to define the user response rules 340. Specifically, the user response rules 340 are automatic actions the monitoring module 230 implements when a user event 150a-e satisfies the user event criteria 320 defined by the calendar owner. Below are representative examples of a few possible automatic actions: 1) declining the invitation or request, 2) accepting the invitation or request, 3) delegating the invitation or request, 4) notifying members of the distribution list of the user absence period, 5) notifying the organizer of the user absence period and/or of what action has been taken on the request/invitation, and ignoring the the invitation or request. The flexibility to define user event criteria 320 and customize a response is advantageous for managing user events 150a-e scheduled during a user absence period 120

In one embodiment, user events 150a-e with a due date during the user absence period 120 use the same user event criteria 320 and user response rules 340 as for user events 150a-e with a due date during the buffer period 130. Alternatively, the owner of a user calendar 110 may define different user event criteria 320 for user events 150a-e with a due date during the user absence period 120 than user events 150a-e with a due date during the buffer period 130. Additionally, the owner of a user calendar 110 may define different user response rules 340 for user events 150a-e with a due date during the user absence period 120 than user events 150a-e with a due date during the buffer period 130.

Below is a table of examples of possible user events types and actions that can be taken for those events.

| User event type | Action |
| --- | --- |
| meeting invitation | 1. decline attending the meeting. |
| | 2. delegate attending the meeting to someone. |
| | 3. notify the distribution list that the user will not attend the meeting. |
| | 4. Ignore the meeting invitation. |
| email with a follow-up | 1. delegate the follow-up. |
| | 2. notify the sender that the user will not complete the follow-up. |
| | 3. ignore the email. |
| chat messages | 1. delegate the chat invitation. |
| | 2. notify the chat organizer that the user will be unable to attend. |
| | 3. Ignore the chat appointment. |
| | 4. decline |
| instant message (IM) | 1. delegate the IM invitation. |
| | 2. notify the IM organizer that the user will be unable to attend. |
| | 3. ignore the IM inviation. |
| | 4. decline |
| Task assignment (ToDo) | 1. delegate the ToDo assignment. |
| | 2. notify the ToDo assigner that the user will be unable to attend. |
| | 3. ignore the ToDo assignment. |
| | 4. decline |

The search module 370 interacts with the system 200 to search and present user events 150a-e that satisfies the user event criteria 320. Specifically, the search module 370 searches one or more calendaring repositories 372 searching for user events 150a-e that satisfies criteria defined by the owner of a user calendar 110. Next the search module 370 presents the user events 150a-e to the owner of the user calendar 110. In one embodiment, the search module 370 searches local and remote calendaring repositories (connected by some form of electronic network to the system 200) for scheduled user events 150a-e that satisfy the user event criteria 320 defined by the owner of the user calendar 110. The search module 370 interacts with the presentation module 360 to present the scheduled user events 150a-e to the calendar owner.

The presentation module 360 interacts with a calendar owner to present, review, modify, and respond to the user events 150a-e located by the search module 370. The presentation module 360 interacts with the search module 370 to receive scheduled user events 150a-e. In one embodiment, the configuration module 220 applies the user response rules 340 to the user events 150a-e located by the search module 370 to define an automated action associated with the scheduled user event 150a-e. The presentation module 360 interacts with the user interface module 362 to present the scheduled user event 150a-e and associated action. In one embodiment, the presentation module 360 prompts an owner of a user calendar 110 to accept or modify the action. Next, the presentation module 360 interacts with the input module 364 to receive a response from the owner of the user calendar 110.

In one embodiment, the user interface module 362 interacts with output devices to present a scheduled user event 150a-e and associated action to the owner of a user calendar 110. The output device may be a device capable of displaying a graphical user interface (GUI), a display device, a printer, a disk file or the like.

Figure 4:
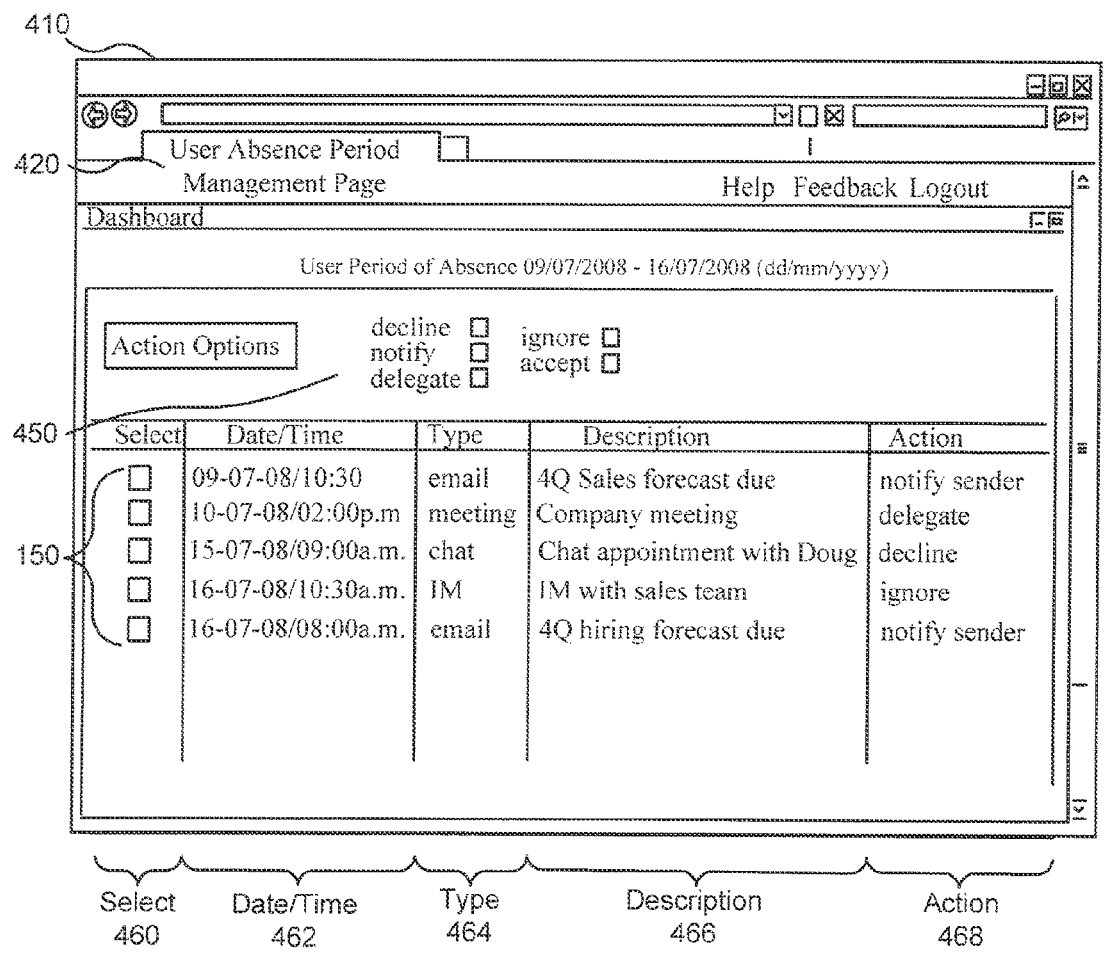
FIG. 4 is an illustration of a graphical user interface of a method for improved management of user events scheduled during a user absence period, in accordance with one embodiment of the invention.

FIG. 4 illustrates one embodiment, of a Graphical User Interface (GUI) 410 to present user events 150a-e found in a storage repository 372. The presentation module 360 communicates with the GUI 410 to present user events 150a-e found in the storage repository 372 to the owner of a user calendar 110.

The GUI 410 displays characteristics of the user events 150a-e to the owner of the user calendar, including: the date/time 462 of the user event 150a-e, the communication 464 type, the description 466, and finally the automatic user action 468. Also, the GUI 410 may include a selection column 460 for selecting the user event 150a-e. After reviewing the user event 150a-e and the action 468 the owner of the user calendar 110 may accept the action 468. Conversely the calendar owner may decide to modify the action to one or more of decline, notify, delegate or ignore. In one embodiment, the ability of the owner of the user calendar 110 to review and modify the action 468 is of value in managing user events 150a-e. In one embodiment, the user selects the user event using a check box 460 on the user absence period management page 420. Then the user selects an option from the response action options 450.

In one embodiment, the system 200 may prompt the owner of the user calendar 110 when the system 200 locates a user event 150a-e that satisfies the user event criteria 320. Prompting the calendar owner may include placing the new user event 150a-e identified in the repository 372 on the GUI 410. In one embodiment, the user may respond to the prompt by clicking on the select 460 box for the user event 150a-e. Next the user selects a action response 450 for the user event 150a-e. The user action option 450 comprise one or more of declining 342, accepting 344, delegating 346, notifying the distribution 348 list, notifying the organizer 350, and ignoring 352. If no modification option is selected, the system 200 may determine the current automatic user response 468 to be acceptable. After the user has responded to the prompt, the user event 150a-e, the select 460 field, the date/time 462 field, the description 466 column, and action 468 field may become unselectable indicating the user has responded to the prompt.

Figure 5:
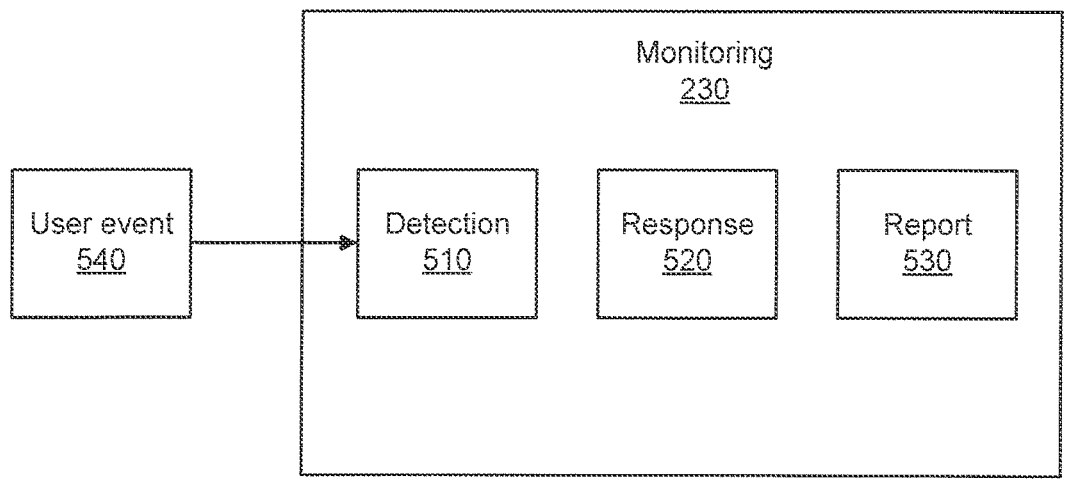
FIG. 5 is a block diagram illustrating still another embodiment of a monitoring module for improved management of user events scheduled during a user absence period, in accordance with one embodiment of the invention.

FIG. 5 illustrates one embodiment of a monitoring module 230 for improved management of user events 150a-e scheduled during a user absence period 120. The monitoring module 220 includes a detection module 510, a response module 520, and a reporting module 530.

The monitoring module 230 interacts with the system 200 to detect, respond and report user events 150a-e scheduled during a user absence period 120. In certain embodiments, the monitoring module 230 is incorporated with or plugs into an existing calendaring system. Alternatively, the monitoring module 230 is a stand-alone software component in communication with an existing calendaring system.

The monitoring module 230 detects one or more user events 150a-e scheduled to come due during the user absence period 120. In addition, the monitoring module 230 responds to the user event 150a-e with a user defined automatic action. Additionally, the monitoring module 230 reports the number of user events 150a-e responded to. In one embodiment, the user events 150a-e are events scheduled by users requiring the owner of the user calendar to attend a meeting or complete a task during the user absence period. In certain embodiments, the calendar owner may define a user response rule 340 for high priority or highly sensitive or anticipated user events 150a-e. In response to such high priority or highly sensitive or anticipated user events 150a-e the automated action may be to notify the calendar owner by way of some private communication medium such as an alternative email address, text message number, phone number, or the like.

The detection module 510 detects new user events 540. In particular, the detection module 510 detects new user events 540 scheduled during a user absence period 120 with a due date during the user absence period 120. In one embodiment, the detection module 510 watches in-coming user events 540, if the user event 540 satisfies user event criteria 320 the detection module 510 calls the response module 520.

The response module 520 interacts with the system 200 to respond to new user events 540. Specifically, the response module 510 in certain embodiments responds with an automatic action defined by the owner of a user calendar 110 in the user response rules 340.

The reporting module 530 in certain embodiments may interact with the owner of a user calendar 110 to report on the new user events 150a-e responded to. In particular, the reporting module 530 reports on the new user events 150a-e detected and responded to during a user absence period 120. In one embodiment, the user reporting module 530 reports the total number of user events 150a-e detected during the user absence period 120, including the user events 150a-e responded to and the user events 150a-e not responded to. In another embodiment, the reporting module 530 reports the user events 150a-e responded to and the automatic action response.

In one embodiment, the owner of a user calendar 110 may use the reporting module 530 to quickly determine the number and type of user events 150a-e responded to during the user absence period 120. The reporting module 530 may be of value in determining how well the owner of a user calendar managed the user events 150a-e during the user absence period 120. Also, the calendar owner may quickly determine if the user event criteria 320 or user respond rules 340 need to be adjusted before the next user absence period 120.

Figure 6:
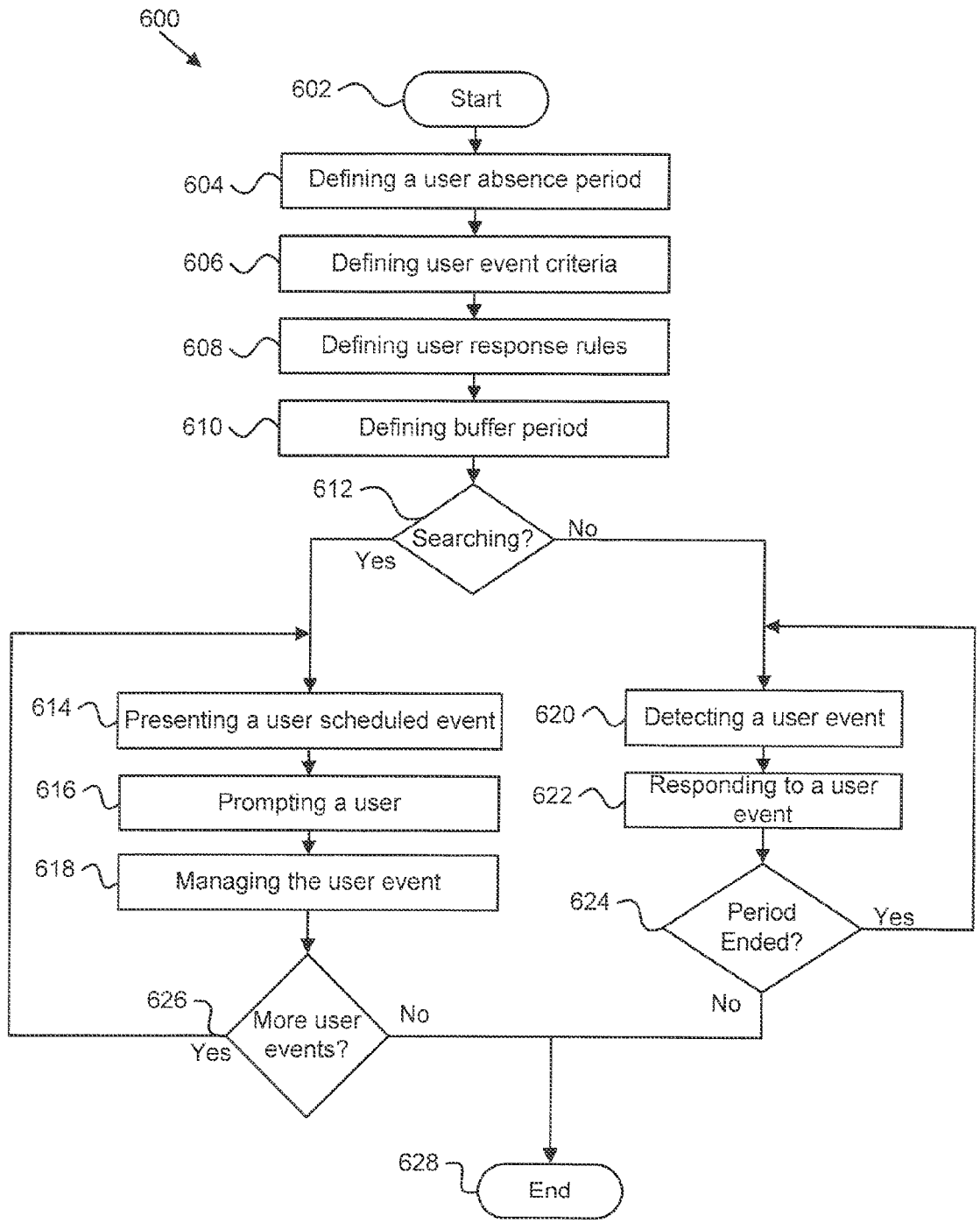
FIG. 6 is a detailed schematic flow chart diagram illustrating one embodiment of a method for improved management of user events scheduled during a user absence period, in accordance with one embodiment of the invention.

FIG. 6 illustrates one embodiment of a method 600 for improved management of user events 150a-e scheduled during a user absence period 120. The operations may be implemented by the executed operations of a computer program product. The method 600 begins 602 when a definition module 310 defines 604 a user absence period 120. The definition module 310 defines a start date and end date for the user absence period 120. In one embodiment, the user absence period 120 may be an off-set from the beginning of the year. Optionally, the user absence period may be input from a database, a website, a configuration file, XML file, text file or the like.

Next, the definition module 310 defines 606 the user event criteria 320. In one embodiment, the definition module 310 defines the parameters for the user event criteria 320 to compare with already scheduled user events 150a-e. In another embodiment, when a system 200 is watching for new user events 540 the monitoring module 230 compares new user events 540 against the user event criteria 320.

Next, the definition module 310 defines 608 the user response rules 340. The user response rules 340 define the actions to execute when the monitoring module 230 determines that a scheduled user event 150a-e in the storage repository 372 satisfies the user event criteria 320. In another embodiment, the monitoring module 230 compares new user events 540 with the user event criteria 320 to determine if a match exists. The user response rules 340 comprise one of declining 342 a user event 150a-e, accepting 344 a user event 150a-e, delegating 346 a user event 150a-e, notifying the distribution 348 of a user event 150a-e, notifying the organizer 350 of a user event 150a-e, and ignoring 352 a user event 150a-e.

Optionally, the configuration module 220 may define 610 the buffer period 130 for user events 150a-e. The buffer period 130 is a period of time before the user absence period 120 begins and/or after the user absence period 120 concludes. Advantageously, the user may set a different a user response 340 for a user event 150a-e that comes due during the buffer period 130 than for a user event 150a-e that comes due during the user absence period 120.

Next, a determination 612 is made whether a storage repository 372 includes user events 150a-e coming due during the user absence period 120. If so, the search module 370 retrieves the storage repository 372 for user events 150a-e that satisfy the user event criteria 320. Next, the presentation module 360 optionally presents 614 the user events 150a-e on a graphical user interface 410. Alternatively, the presentation module 360 may direct the user events 150a-e to a disk file, email message, printer or the like. In one embodiment, the search module 370 accepts wild card search options.

Next, in one embodiment, the presentation module 360 prompts 616 the owner of the user calendar 110 to manage the user event 150a-e scheduled during one or more user absence periods 120.

Next, the owner of a user calendar 110 interacts with the user interface 362 to manage 618 the user events 150a-e. In one embodiment, the user may accept 322 the automatic user response 464 associated with the user event 150a-e. In another embodiment, the GUI 410 allows the owner of the user calendar 110 to modify the automatic user response.

Next, a determination 626 is made if more user events 150a-e were retrieved. If so, the method 600 returns to step 614. If not, the method 600 ends 628.

If the determination 612 is made that no user events 150a-e are currently scheduled during the user absence period 120, the system 200 may automatically enter a monitoring mode. In monitoring mode, the detection module 510 detects 620 new user events 540 sent to the owner of the calendar that satisfies the predefined user event criteria 320. The response module 520 responds 622 to the new user event 540 with an automatic user response associated with the user event 540. Next, the system 200 determines if the user absence period 120 and buffer period 130 have concluded 624. If so, the method 200 ends 628. If not, the method 600 returns to step 620 to continue monitoring new user events 540 sent to this user that satisfy the predefined user event criteria 320.

A user may configure one or more user absence periods 120 and buffer periods 130 as templates. Each template may define the user absence period 120, the buffer period 130, user event criteria 320 and user response rules 340. In one embodiment, the user may define a vacation template, a business travel template, a do not disturb template or the like. It is of value in managing user events 150a-e to have the capability to define templates in advance, then the owner of a user calendar 110 only needs to enable the template for the respective user absence period 120.

Figure 7:
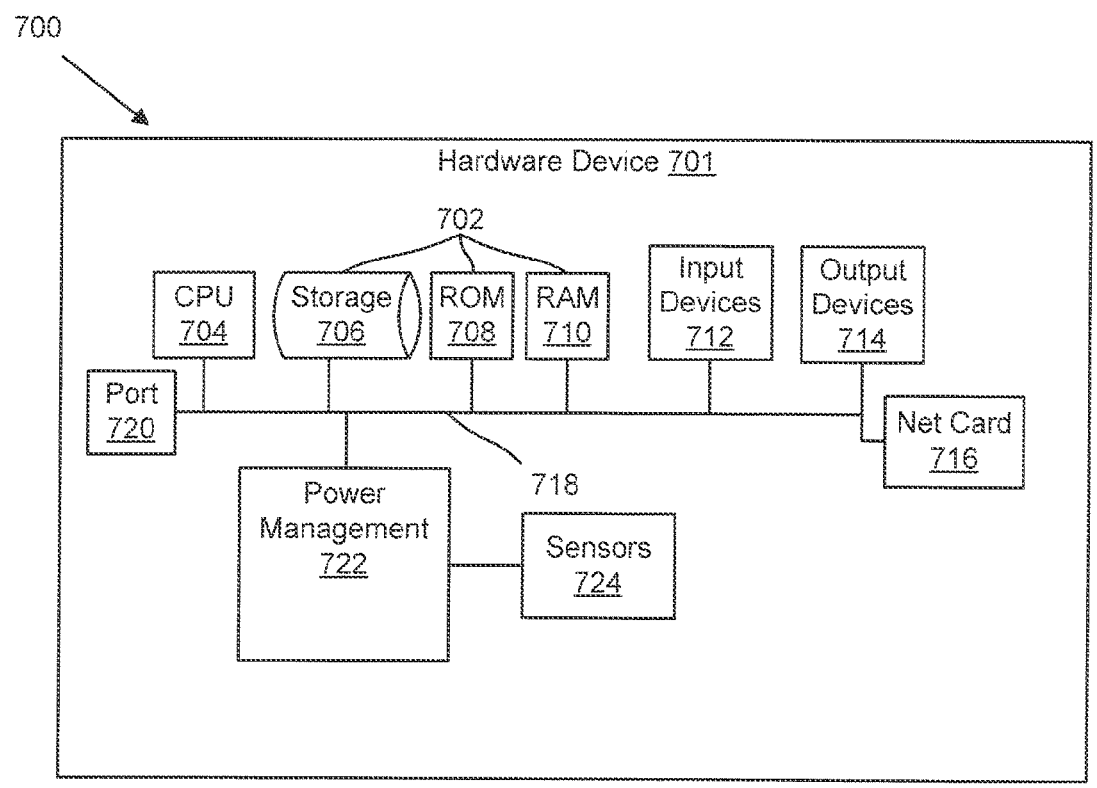
FIG. 7 is a block diagram of one embodiment of a hardware system capable of executing an embodiment for improved management of user events scheduled during a user absence period, in accordance with one embodiment of the invention.

FIG. 7 illustrates a schematic block diagram of one embodiment of an electronic device suitable for executing computer program code for one or more embodiments of the system 200. In certain embodiments, the electronic device is a computer. The device may constitute any type of electronic equipment, including a tablet computer, a PDA, and the like.

The device may include a processor or CPU 704. The CPU 704 may be operably coupled to one or more memory devices 702. The memory devices 702 may include a non-volatile storage device 706 such as a hard disk drive or CD ROM drive, a read-only memory (ROM) 708, and a random access volatile memory (RAM) 710.

The computer in general may also include one or more input devices 712 for receiving inputs from a user or from another device. The input devices 712 may include a keyboard, pointing device, touch screen, or other similar human input devices. Similarly, one or more output devices 714 may be provided within or may be accessible from the computer. The output devices 714 may include a display, speakers, or the like. A network port such as a network interface card 716 may be provided for connecting to a network.

Within an electronic device such as the computer, a system bus 718 may operably interconnect the CPU 704, the memory devices 702, the input devices 712, the output devices 714, the network card 716, and one or more additional ports 720. The ports may allow for connections with other resources or peripherals, such as printers, digital cameras, scanners, and the like.

The computer also includes a power management unit 722 in communication with one or more sensors 724. The power management unit 722 automatically adjusts the power level to one or more subsystems of the computer. Of course, the subsystems may be defined in various manners. In the depicted embodiment, the CPU 704, ROM 708, and RAM 710 may comprise a processing subsystem. Non-volatile storage 706 such as disk drives, CD-ROM drives, DVD drives, and the like may comprise another subsystem. The input devices 712 and output devices 714 may also comprise separate subsystems.

FIG. 7 illustrates one embodiment of a system 700 for improved management of user events 150-154 scheduled during a user absence period 120. The system 700 of FIG. 7, may execute the instructions of the configuration module 220 and monitoring module 230 for improved management of user events 150a-e scheduled during a user absence period 120. The configuration module 220 and the monitoring module 230 may execute on the same enclosure or on different enclosures.

What is claimed is:

1. A method for managing user events scheduled during a user absence period, the method comprising:
    identifying a user absence period defined on a user calendar;
    identifying a buffer period, the buffer period being at least one of a period of time before the user absence period begins and a period of time after the user absence period concludes;
    searching at least one calendaring repository to determine whether there are any user events with a due date coming due during the user absence period that were scheduled prior to a user defining the user absence period;
    responding, using a processor, to each user event scheduled prior to a user defining the user absence period and having a due date coming due during the user absence period;
    searching at least one calendaring repository to determine whether there are any user events with a due date coming due during the buffer period that were scheduled prior to the user defining the buffer period; and
    responding, using the processor, to each user event scheduled prior to the user defining the buffer period and having a due date coming due during the buffer period, in a manner differently from responding to user events coming due during the user absence period.

2. The method of claim 1, wherein identifying a buffer period comprises identifying a buffer period that includes both a period of time before the user absence period begins and a period of time after the user absence period concludes.

3. The method of claim 1, wherein responding to each user event scheduled prior to a user defining the user absence period, and responding to each user event scheduled prior to the user defining the buffer period comprises:
presenting each scheduled event to an owner of the calendar;
requiring the owner to select an action for each presented event; and
implementing the selected action for each presented event.

4. The method of claim 3, wherein requiring the owner to select an action for each presented event comprises:
providing a default action for at least one presented event; and
allowing the owner to modify the default action.

5. The method of claim 1, further comprising:
defining user event criteria;
defining user response rules;
searching for events that satisfy the defined event criteria; and
implementing an associated user response rule to a select event that satisfies a corresponding event criteria.

6. The method of claim 5, wherein:
defining user response rules comprises defining different response rules for events within the buffer period from events within the user absence period; and
responding to each user event scheduled prior to the user defining the buffer period in a manner differently from responding to user events coming due during the user absence period, comprises:
implementing a first user response rule when a select event is due within the user absence period, and implementing a second user response rule different from the first user response rule when the select event is due within the buffer period.

7. The method of claim 1, further comprising:
defining user event criteria for the user absence period and the buffer period;
defining user response rules for the user absence period and the buffer period;
configuring a template that comprises:
the duration of the user absence period and the buffer period;
the defined user event criteria; and;
the defined user response rules.

8. A non-transitory computer-readable storage device with an executable program stored thereon, wherein the program instructs a microprocessor to manage user events scheduled during a user absence period, comprising:
program code for identifying a user absence period defined on a user calendar;
program code for identifying a buffer period, the buffer period being at least one of a period of time before the user absence period begins and a period of time after the user absence period concludes;
program code for searching at least one calendaring repository to determine whether there are any user events with a due date coming due during the user absence period that were scheduled prior to a user defining the user absence period;
program code for responding, using a processor, to each user event scheduled prior to a user defining the user absence period and having a due date coming due during the user absence period;
program code for searching at least one calendaring repository to determine whether there are any user events with a due date coming due during the buffer period that were scheduled prior to the user defining the buffer period; and
program code for responding, using the processor, to each user event scheduled prior to the user defining the buffer period and having a due date coming due during the buffer period, in a manner differently from responding to user events coming due during the user absence period.

9. The non-transitory computer-readable storage device of claim 8, wherein the program code for identifying a buffer period comprises program code for identifying a buffer period that includes both a period of time before the user absence period begins and a period of time after the user absence period concludes.

10. The non-transitory computer-readable storage device of claim 8, wherein the program code for responding to each user event scheduled prior to a user defining the user absence period, and responding to each user event scheduled prior to the user defining the buffer period comprises:
program code for presenting each scheduled event to an owner of the calendar;
program code for requiring the owner to select an action for each presented event; and
program code for implementing the selected action for each presented event.

11. The non-transitory computer-readable storage device of claim 10, wherein the program code for requiring the owner to select an action for each presented event comprises:
program code for providing a default action for at least one presented event; and
program code for allowing the owner to modify the default action.

12. The non-transitory computer-readable storage device of claim 8, further comprising:
program code for defining user event criteria;
program code for defining user response rules;
program code for searching for events that satisfy the defined event criteria; and
program code for implementing an associated user response rule to a select event that satisfies a corresponding event criteria.

13. The non-transitory computer-readable storage device of claim 12, wherein:
the program code for defining user response rules comprises program code for defining different response rules for events within the buffer period from events within the user absence period; and
the program code for responding to each user event scheduled prior to the user defining the buffer period in a manner differently from responding to user events coming due during the user absence period, comprises:
program code for implementing a first user response rule when a select event is due within the user absence period, and implementing a second user response rule different from the first user response rule when the select event is due within the buffer period.

14. The non-transitory computer-readable storage device of claim 8, further comprising:
program code for defining user event criteria for the user absence period and the buffer period;
program code for defining user response rules for the user absence period and the buffer period;
program code for configuring a template that comprises:
the duration of the user absence period and the buffer period;
the defined user event criteria; and;
the defined user response rules.

15. An apparatus for managing user events scheduled during a user absence period, the apparatus comprising:
a microprocessor coupled to a memory, wherein the microprocessor is programmed to manage user events scheduled during a user absence period by:
identifying a user absence period defined on a user calendar;
identifying a buffer period, the buffer period being at least one of a period of time before the user absence period begins and a period of time after the user absence period concludes;
searching at least one calendaring repository to determine whether there are any user events with a due date coming due during the user absence period that were scheduled prior to a user defining the user absence period;
responding, using a processor, to each user event scheduled prior to a user defining the user absence period and having a due date coming due during the user absence period;
searching at least one calendaring repository to determine whether there are any user events with a due date coming due during the buffer period that were scheduled prior to the user defining the buffer period; and
responding, using the processor, to each user event scheduled prior to the user defining the buffer period and having a due date coming due during the buffer period, in a manner differently from responding to user events coming due during the user absence period.

16. The apparatus of claim 15, wherein the microprocessor implements identifying a buffer period by identifying a buffer period that includes both a period of time before the user absence period begins and a period of time after the user absence period concludes.

17. The apparatus of claim 15, wherein the microprocessor implements responding to each user event scheduled prior to a user defining the user absence period, and responding to each user event scheduled prior to the user defining the buffer period by:
presenting each scheduled event to an owner of the calendar;
requiring the owner to select an action for each presented event; and
implementing the selected action for each presented event.

18. The apparatus of claim 17, wherein the microprocessor implements requiring the owner to select an action for each presented event by:
providing a default action for at least one presented event; and
allowing the owner to modify the default action.

19. The apparatus of claim 15, wherein the microprocessor is further programmed to:
defining user event criteria;
defining user response rules;
searching for events that satisfy the defined event criteria; and
implementing an associated user response rule to a select event that satisfies a corresponding event criteria.

20. The apparatus of claim 19, wherein:
the microprocessor implements defining user response rules by defining different response rules for events within the buffer period from events within the user absence period; and
the microprocessor implements responding to each user event scheduled prior to the user defining the buffer period in a manner differently from responding to user events coming due during the user absence period, by:
implementing a first user response rule when a select event is due within the user absence period, and implementing a second user response rule different from the first user response rule when the select event is due within the buffer period.

21. The apparatus of claim 15, wherein the microprocessor is further programmed to:
defining user event criteria for the user absence period and the buffer period;
defining user response rules for the user absence period and the buffer period;
configuring a template that comprises:
the duration of the user absence period and the buffer period;
the defined user event criteria; and;
the defined user response rules.

* * * * *